United States Patent
Moctezuma de la Barrera et al.

(10) Patent No.: US 7,623,250 B2
(45) Date of Patent: Nov. 24, 2009

(54) ENHANCED SHAPE CHARACTERIZATION DEVICE AND METHOD

(75) Inventors: José Luis Moctezuma de la Barrera, Freiburg (DE); Waldean A. Schulz, Boulder, CO (US); Donald W. Malackowski, Schoolcraft, MI (US)

(73) Assignee: Stryker Leibinger GmbH & Co. KG., Freiburg (DE)

( * ) Notice: Subject to any disclaimer, the term of this patent is extended or adjusted under 35 U.S.C. 154(b) by 861 days.

(21) Appl. No.: 11/050,920

(22) Filed: Feb. 4, 2005

(65) Prior Publication Data

US 2006/0241404 A1 Oct. 26, 2006

(51) Int. Cl.
- *G01B 11/14* (2006.01)
- *A61B 5/00* (2006.01)
- *G06K 9/00* (2006.01)
- *G06F 19/00* (2006.01)

(52) U.S. Cl. .................. 356/604; 600/424; 382/199; 702/85

(58) Field of Classification Search ......... 600/407–427, 600/429, 437–440, 485; 250/229; 378/197; 345/7, 6, 156, 425, 473; 382/118, 103, 199, 382/128, 154; 356/600–640, 141.1–141.31, 356/375, 376; 606/130; 702/85, 60, 6, 127, 702/152, 45

See application file for complete search history.

(56) References Cited

U.S. PATENT DOCUMENTS

| | | | |
|---|---|---|---|
| 3,942,522 A | 3/1976 | Wilson | 128/90 |
| 4,346,717 A | 8/1982 | Haerten | 128/660 |
| 4,370,554 A | 1/1983 | Bohlen et al. | 250/491.1 |
| 4,416,019 A | 11/1983 | Weiss et al. | 378/2 |
| 4,461,016 A | 7/1984 | Weiss et al. | 378/23 |
| 4,567,896 A | 2/1986 | Barnea et al. | 128/660 |
| 4,673,352 A | 6/1987 | Hansen | 433/69 |
| 4,722,056 A | 1/1988 | Roberts et al. | 364/413 |
| 4,757,379 A | 7/1988 | Wright | 358/88 |

(Continued)

FOREIGN PATENT DOCUMENTS

EP 0 535 552 4/1993

(Continued)

OTHER PUBLICATIONS

Horstmann G.A. and H.F. Reinhandt (1994). "Micro-Stereometry: A Frameless Computerized Navigating System for Open Microsurgery." *Computerized Medical Imaging & Graphics*, 18(4): 229-33.

(Continued)

*Primary Examiner*—Eric F Winakur
*Assistant Examiner*—Lawrence N Laryea
(74) *Attorney, Agent, or Firm*—McCracken & Frank LLP

(57) ABSTRACT

The shape and orientation of rigid or nearly rigid moveable bodies are determined using a shape characterization. Sensors capture a plurality of representations of different perspectives of the body that are analyzed to determine a bounding volume of the body. The shape of the body is determined from the bounding volume. The position of the body is determined using tracking devices that sense the position of the body. The bounding volume and position information are combined to define the shape and orientation in space of the body, and in particular the position of a point of interest on the body.

48 Claims, 11 Drawing Sheets

U.S. PATENT DOCUMENTS

| | | | |
|---|---|---|---|
| 4,836,778 A | 6/1989 | Baumrind et al. | 433/69 |
| 4,873,651 A | 10/1989 | Raviv | 364/513 |
| 4,908,656 A | 3/1990 | Suwa et al. | 355/53 |
| 4,972,836 A | 11/1990 | Schenck et al. | 128/653 |
| 5,050,608 A | 9/1991 | Watanabe et al. | 128/653 R |
| 5,142,930 A | 9/1992 | Allen et al. | 74/469 |
| 5,155,435 A | 10/1992 | Kaufman et al. | 324/309 |
| 5,172,331 A | 12/1992 | Yamada | 364/491 |
| 5,186,174 A | 2/1993 | Schlöndorff et al. | 128/653.1 |
| 5,197,476 A | 3/1993 | Nowacki et al. | 128/660.03 |
| 5,198,877 A | 3/1993 | Schulz | 356/375 |
| 5,206,893 A | 4/1993 | Hara | 378/65 |
| 5,207,681 A | 5/1993 | Ghadjar et al. | 606/96 |
| 5,222,499 A | 6/1993 | Allen et al. | 128/653.1 |
| 5,230,623 A | 7/1993 | Guthrie et al. | 433/72 |
| 5,251,127 A | 10/1993 | Raab | 364/413.13 |
| 5,276,337 A | 1/1994 | Starikov | 250/548 |
| 5,299,288 A | 3/1994 | Glassman et al. | 395/80 |
| 5,305,203 A | 4/1994 | Raab | 364/413.13 |
| 5,309,913 A | 5/1994 | Kormos et al. | 128/653.1 |
| 5,365,996 A | 11/1994 | Crook | 164/45 |
| 5,383,454 A | 1/1995 | Bucholz | 128/653.1 |
| 5,389,101 A | 2/1995 | Heilbrun et al. | 606/130 |
| 5,393,988 A | 2/1995 | Sakamoto | 250/492.22 |
| 5,394,875 A | 3/1995 | Lewis et al. | 128/660.09 |
| 5,400,428 A | 3/1995 | Grace | 385/115 |
| 5,412,811 A | 5/1995 | Hildenbrand et al. | 2/10 |
| 5,419,320 A | 5/1995 | Kawaguchi et al. | 128/633 |
| 5,422,491 A | 6/1995 | Sakamoto | 250/492.22 |
| 5,447,154 A | 9/1995 | Cinquin et al. | 128/653.1 |
| 5,512,946 A | 4/1996 | Murata et al. | 348/222 |
| 5,517,990 A | 5/1996 | Kalfas et al. | 128/653.1 |
| 5,564,437 A | 10/1996 | Bainville et al. | 128/774 |
| 5,591,207 A | 1/1997 | Coleman | 606/232 |
| 5,617,857 A | 4/1997 | Chader et al. | 128/653.1 |
| 5,622,170 A | 4/1997 | Schulz | 128/653.1 |
| 5,637,866 A * | 6/1997 | Riener et al. | 250/229 |
| 5,662,111 A | 9/1997 | Cosman | 128/653.1 |
| 5,676,673 A | 10/1997 | Ferre et al. | 606/130 |
| 5,682,890 A | 11/1997 | Kormos et al. | 128/653.2 |
| 5,690,108 A | 11/1997 | Chakeres | 128/653.1 |
| 5,697,368 A | 12/1997 | Luber et al. | 128/653.1 |
| 5,706,811 A | 1/1998 | Takeda et al. | 128/653.1 |
| 5,732,703 A | 3/1998 | Kalfas et al. | 128/653.1 |
| 5,740,222 A | 4/1998 | Fujita et al. | 378/4 |
| 5,748,696 A | 5/1998 | Fujita et al. | 378/4 |
| 5,772,594 A | 6/1998 | Barrick | 600/407 |
| 5,787,886 A | 8/1998 | Kelly et al. | 128/653.1 |
| 5,795,294 A | 8/1998 | Luber et al. | 600/407 |
| 5,797,924 A | 8/1998 | Schulte et al. | 606/130 |
| 5,807,256 A | 9/1998 | Taguchi et al. | 600/425 |
| 5,848,126 A | 12/1998 | Fujita et al. | 378/195 |
| 5,848,967 A | 12/1998 | Cosman | 600/426 |
| 5,851,183 A | 12/1998 | Bucholz | 600/425 |
| 5,855,553 A | 1/1999 | Tajima et al. | 600/407 |
| 5,876,325 A | 3/1999 | Mizuno et al. | 600/102 |
| 5,878,103 A | 3/1999 | Sauer et al. | 378/15 |
| 5,880,846 A | 3/1999 | Hasman et al. | 356/376 |
| 5,891,034 A | 4/1999 | Bucholz | 600/426 |
| 5,921,992 A | 7/1999 | Costales et al. | 606/130 |
| 6,006,126 A * | 12/1999 | Cosman | 600/426 |
| 6,021,343 A | 2/2000 | Foley et al. | 600/429 |
| 6,081,336 A | 6/2000 | Messner et al. | 356/375 |
| 6,112,113 A | 8/2000 | Van Der Brug et al. | 600/427 |
| 6,167,295 A | 12/2000 | Cosman | 600/426 |
| 6,175,415 B1 | 1/2001 | Pietrzak et al. | 356/376 |
| 6,181,815 B1 | 1/2001 | Marugame | 382/154 |
| 6,226,003 B1 | 5/2001 | Akeley | 345/419 |
| 6,285,902 B1 | 9/2001 | Kienzle, III et al. | 600/427 |
| 6,301,498 B1 | 10/2001 | Greenberg et al. | 600/425 |
| 6,306,126 B1 | 10/2001 | Moctezuma | 606/1 |
| 6,317,139 B1 | 11/2001 | Williams | 345/634 |
| 6,356,272 B1 | 3/2002 | Matsumoto et al. | 345/582 |
| 6,442,416 B1 | 8/2002 | Schultz | 600/429 |
| 6,455,835 B1 | 9/2002 | Bernardini et al. | 250/208.1 |
| 6,512,844 B2 | 1/2003 | Bouguet et al. | 382/154 |
| 6,529,192 B1 | 3/2003 | Waupotitsch | 345/419 |
| 6,535,219 B1 | 3/2003 | Marshall et al. | 345/581 |
| 6,567,156 B1 | 5/2003 | Kerner | 356/30 |
| 6,592,033 B2 | 7/2003 | Jennings et al. | 235/385 |
| 6,662,036 B2 * | 12/2003 | Cosman | 600/411 |
| 6,788,062 B2 | 9/2004 | Schweikard et al. | 324/321 |
| 6,788,827 B1 | 9/2004 | Makram-Ebeid | 382/276 |
| 6,792,074 B2 | 9/2004 | Erbel et al. | 378/65 |
| 2003/0164953 A1 | 9/2003 | Bauch et al. | 356/611 |
| 2003/0195526 A1 | 10/2003 | Vilsmeier | 606/130 |
| 2004/0013305 A1 * | 1/2004 | Brandt et al. | 382/224 |
| 2004/0170247 A1 | 9/2004 | Poole et al. | 378/4 |
| 2004/0170308 A1 | 9/2004 | Belykh et al. | 382/128 |
| 2004/0171922 A1 | 9/2004 | Rouet et al. | 600/407 |
| 2004/0175034 A1 | 9/2004 | Wiemker et al. | 382/173 |
| 2004/0181144 A1 | 9/2004 | Cinquin et al. | 600/407 |
| 2004/0181149 A1 | 9/2004 | Langlotz et al. | 600/431 |
| 2006/0036148 A1 * | 2/2006 | Grimm | 600/407 |

FOREIGN PATENT DOCUMENTS

| | | | |
|---|---|---|---|
| EP | 0 501 812 | 9/2002 | 15/72 |
| EP | 1 189 537 | 9/2004 | |
| EP | 1 340 470 | 9/2004 | |
| EP | 1 354 564 | 9/2004 | |
| JP | 05-111886 | 9/1975 | 5/4 |
| JP | 55-73253 | 6/1980 | |
| JP | 55-81640 | 6/1980 | 17/34 |
| JP | 55-81641 | 6/1980 | 17/34 |
| JP | 55-94244 | 7/1980 | |
| JP | 55-110539 | 8/1980 | 17/34 |
| JP | 56-45649 | 4/1981 | 17/34 |
| JP | 57-021250 | 2/1982 | 3/52 |
| JP | 57-122862 | 7/1982 | 17/34 |
| JP | 57-195447 | 12/1982 | |
| JP | 7-53160 | 9/1985 | |
| JP | 60-185538 | 9/1985 | |
| JP | 61-25531 | 2/1986 | 6/2 |
| JP | 61-31129 | 2/1986 | |
| JP | 61-73308 | 5/1986 | 17/34 |
| JP | 62-057784 | 3/1987 | 37/8 |
| JP | 63-53511 | 4/1988 | 8/14 |
| JP | 63-59610 | 4/1988 | 17/34 |
| JP | 01-236046 | 9/1989 | |
| JP | 01-245108 | 9/1989 | |
| JP | 01-288250 | 11/1989 | |
| JP | 03-032649 | 2/1991 | 6/3 |
| JP | 03-057466 | 3/1991 | 5/10 |
| JP | 3-73113 | 7/1991 | 17/34 |
| JP | 03-155837 | 7/1991 | 6/3 |
| JP | 03-193040 | 8/1991 | 5/55 |
| JP | 03-210245 | 9/1991 | 6/3 |
| JP | 04-161145 | 6/1992 | 6/3 |
| JP | 05-007554 | 1/1993 | |
| JP | 5-8010 | 2/1993 | 17/36 |
| JP | 05-049644 | 3/1993 | |
| JP | 05-184554 | 7/1993 | 5/55 |
| JP | 06-038975 | 2/1994 | 17/36 |
| JP | 06-019710 | 3/1994 | |
| JP | 06-063033 | 3/1994 | |
| JP | 06-149950 | 5/1994 | 15/60 |
| JP | 06-205793 | 7/1994 | |
| JP | 06-251038 | 9/1994 | 15/21 |
| JP | 07-194616 | 8/1995 | |
| JP | 07-236633 | 9/1995 | 6/3 |
| JP | 07-255723 | 10/1995 | |
| JP | 07-303651 | 11/1995 | |
| JP | 07-308303 | 11/1995 | 5/55 |

| | | | | | | |
|---|---|---|---|---|---|---|
| JP | 07-313527 | 12/1995 | | JP | 09-019441 | 1/1997 |
| JP | 07-323035 | 12/1995 | | JP | 26-00627 | 8/1999 |
| JP | 07-328016 | 12/1995 | | WO | WO 96/11624 | 4/1996 |
| JP | 08-010266 | 1/1996 | | WO | WO 96/32059 | 10/1996 |
| JP | 08-024233 | 1/1996 | ................. 5/5 | WO | WO 00/04506 | 1/2000 |
| JP | 08-038439 | 2/1996 | ................. 5/55 | WO | WO 01/00092 | 1/2001 |
| JP | 08-038506 | 2/1996 | | WO | WO 01/11553 | 2/2001 |
| JP | 08-038507 | 2/1996 | | | | |
| JP | 08-107893 | 4/1996 | ................. 6/3 | | | |
| JP | 08-112240 | 5/1996 | | | | |
| JP | 08-150129 | 6/1996 | ................. 5/5 | | | |
| JP | 08-173449 | 7/1996 | | | | |
| JP | 08-215211 | 8/1996 | | | | |
| JP | 08-224255 | 9/1996 | | | | |
| JP | 08-238248 | 9/1996 | | | | |
| JP | 08-238257 | 9/1996 | | | | |
| JP | 08-275206 | 10/1996 | ................. 13/2 | | | |

OTHER PUBLICATIONS

Zamorano, L.J., L. Nolte et al. (1994). "Interactive Intraoperative Localization Using an Infrared-Base System." *Stereotactic & Functional Neurosurgery*. 63(1-4): 84-8.

Phillips, R., W. J. Viant et al. (1995). "Image Guided Orthopaedic Surgery Design and Analysis." *Transactions of the Institute of Measurement and Control*. 17(5): 251-264.

* cited by examiner

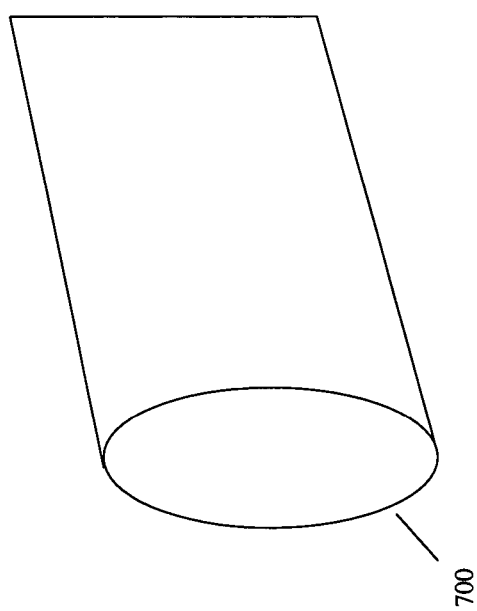
FIG. 7a
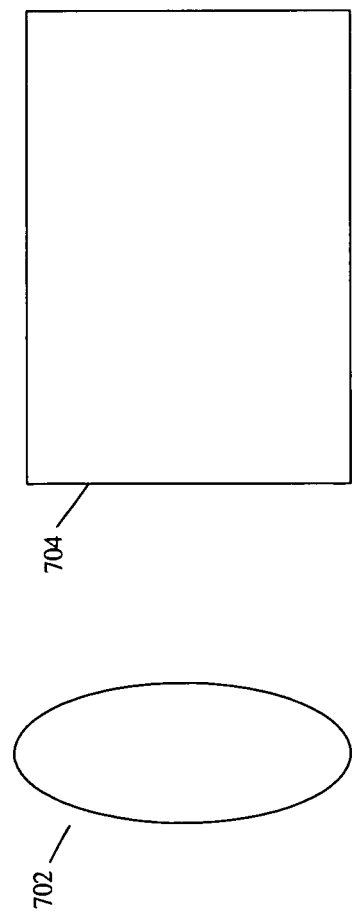
FIG. 7c
FIG. 7d
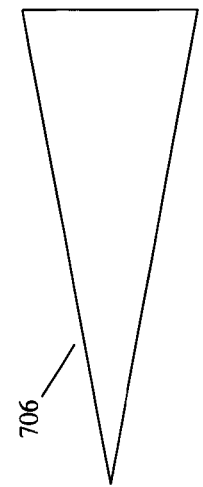
FIG. 7b

ENHANCED SHAPE CHARACTERIZATION DEVICE AND METHOD

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

This invention relates to the determination of the shape of rigid or nearly rigid bodies. More particularly, this invention relates to shape determination of such bodies using a computer navigation system.

2. Description of the Background of the Invention

Computer determination of the location of bodies has been used in manufacturing and medical fields for a number of years. Computer navigation requires that the bodies to be tracked by the navigation system have a known shape, so that the orientation and position of the bodies can be properly tracked by the system. Tracking is accomplished by either attaching a tracking device to the body or embedding the tracking device into the body. There are numerous tracking technologies including active and passive optical tracking systems, magnetic systems and inertial systems.

For many applications it is necessary to field calibrate bodies so that the navigation system can thereafter track the body and realistically render the body graphically on a computer display. Typically, this is done by attaching the tracking device in a fixed relation with the body and then inserting the body into a calibration device. These devices can be as simple as a divot in a known relation to the navigation system or can be a device that constrains the body in a predetermined attitude relative to the navigation system with the tip of the body located in a predetermined position. Current tracking calibration requires some physical contact between the body and a calibration device.

For certain situations, it may be desirable to minimize contact with other devices or bodies. For instance in a surgical setting, sterility requirements require that the body to be used be sterile and that every body it contacts in any way also be sterile. This necessitates sterilizing the calibration device and maintaining the calibration device within the sterile field. With space at a premium in a surgical suite, this can be a problem.

In addition, bodies that include attachments, such as screwdrivers, drills, implant insertion devices, etc., need to be recalibrated each time a new attachment is inserted. Lastly, some devices do not have an axial shape with the result that these bodies have been difficult to field calibrate using known methods.

SUMMARY OF THE INVENTION

According to one aspect of the invention, a system determines the shape and orientation of a body relative to a tracking device. A sensing device generates a series of representation of the body. A tracking device capable of being detected by a computer navigation system is associated with the body such that the position of the body is located relative to the computer navigation system. The computer navigation system having a central processing unit processes the series of representations of the body and the relative location of the body in order to determine the shape and orientation of the body relative to the tracking device.

In accordance with another aspect of the invention, the shape and orientation of a body relative to an emitter are determined by a system. A sensing device generates a series of representation of the body. An emitter capable of being detected by a computer navigation system is associated with the body such that the position of the body is located relative to the computer navigation system. The computer navigation system having a central processing unit processes the series of representations of the body and the relative location of the body in order to determine the shape and orientation of the body relative to the emitter.

In accordance with a further aspect of the invention, a method to determine the shape and orientation of a body relative to a tracking device using a computer navigation system includes the step of generating a series of representation of the body and thereafter using these representations to determine a composite bounding volume of the body. The shape of the body is determined using the composite bounding volume. A position and an orientation of the body is determined using a tracking device associated with the body that communicates with the computer navigation system.

In yet a further aspect of the invention, a method to determine the shape and orientation of a body using a computer navigation system includes the step of generating a series of representations of the body from at least two perspectives. A composite bounding volume is determined from the series of representations and the shape of the body is determined from the composite bounding volume. The position and orientation of the body are determined from the shape of the body and the series of representations of the body.

BRIEF DESCRIPTION OF THE DRAWINGS

FIG. 7a is a perspective view of a preferred calibration body;

FIG. 7b is a front view of the preferred calibration body of FIG. 7a;

FIG. 7c is a side view of the preferred calibration body of FIG. 7a;

FIG. 7d is a top view of the preferred calibration body of FIG. 7a;

DETAILED DESCRIPTION OF THE PREFERRED EMBODIMENTS

Figure 1:
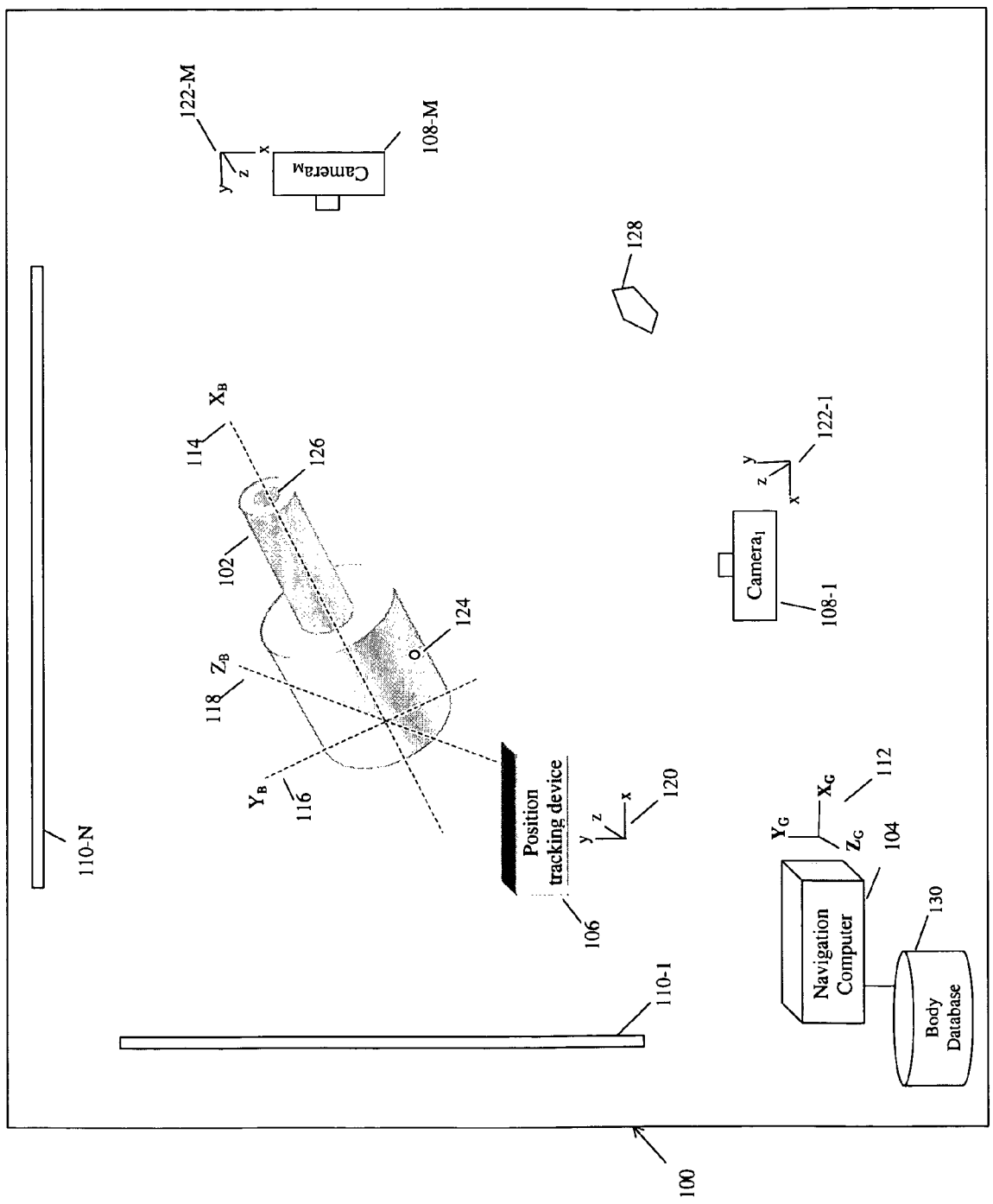
FIG. 1 is a schematic representation of one embodiment of the present invention.

FIG. 1 shows one embodiment of a shape characterization system 100 useful to characterize a body 102, that includes a navigation computer 104, a position tracking device 106, a plurality of cameras 108-1 through 108-M, and a plurality of backgrounds 110-1 through 110-N. The shape characterization system 100 locates the position and orientation of the body 102 in space with respect to a global coordinate system 112 established by the navigation computer 104. Specifically, the shape characterization system determines the position and orientation of body axes $X_B$ 114, $Y_B$ 116, and $Z_B$ 118 that are local to the body 102 with respect to the global coordinate system 112 established by the navigation computer 104. The position and orientation of the body axes 114, 116, and 118 determined by the shape characterization system 100 can be expressed as a linear transformation matrix that maps points on the body 102 in the local coordinate space defined by the body axes 114, 116, and 118 to points in the global coordinate system 112.

The position tracking device 106 has a local coordinate system 120, and each of the cameras 108-1 through 108-M have their own local coordinate systems 122-1 through 122-M. Suitable devices for use as the cameras 108-1 through 108-M include known digital video cameras, digital still cameras, image capture devices and the like.

The position tracking device 106 has a predetermined and fixed relationship to the body 102 and is calibrated to the computer navigation system 104. Furthermore, the position tracking device 106 is capable of tracking the position of a fixed point 124 on the surface of the body 102 with respect to either the coordinate system 120 of the position tracking device 106 or with respect to the coordinate system 112 of the navigation computer 104 because the two coordinate systems are calibrated to one another. The calibration of the two coordinate systems enables any measurements of the point 124 on the body 102 with respect to the coordinate system 120 of the position tracking device 106 to be mapped to the coordinate system 112 of the navigation computer 104 through a linear transformation.

The position tracking device 106 can be physically separate from the body 102, or alternatively, the position tracking device 106 can be attached to or otherwise incorporated into the body 102 and still provide the necessary position information. The point 124 can be located in a fixed position relative to the position tracking device 106 or can be determined by a calibration method described hereinafter. The point 124 can be the location of an emitter used by the position tracking device 106, as is discussed hereinafter.

Figure 2C:
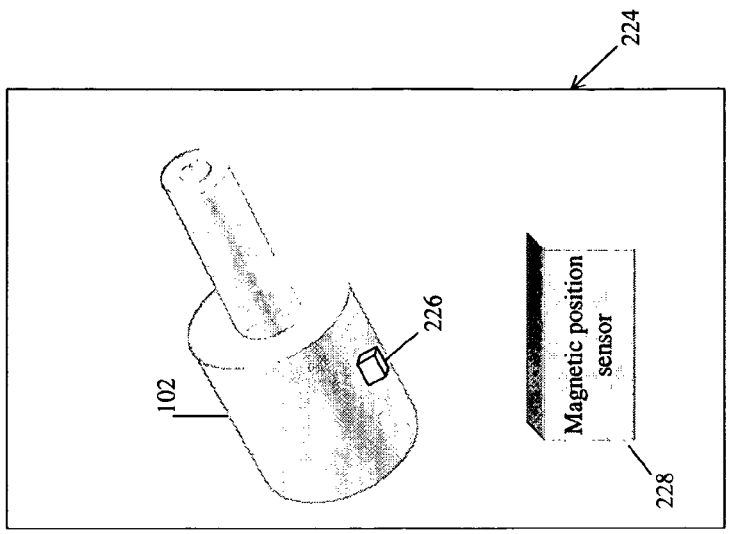
FIG. 2c is a schematic view of a further embodiment of the present invention.

The position tracking device 106 can be one of any of a number of position sensing devices known to those familiar with the art. FIG. 2a shows the use of an example of the position tracking device 200 that uses an optical position sensor 204. Tracking a body using the optical position sensor 204 entails placing an emitter 206 on the body 102, wherein the emitter 206 is an emissive light (visible or infrared) source. Also, multiple emitters 206 can be affixed to the body 102 in known configurations. The optical position sensor 206 uses a light sensor 208 tuned to detect the light emitted by the light source and track the emissive light source 206 as it moves with the body 102. A light emitting diode (LED) is a typical emissive light source 206 and a charge coupled device (CCD) is a typical light sensor 208. The FlashPoint system of Stryker Corporation (Kalamazoo, Mich.) is an example of the optical tracking system as shown in FIG. 2a.

Figure 2B:
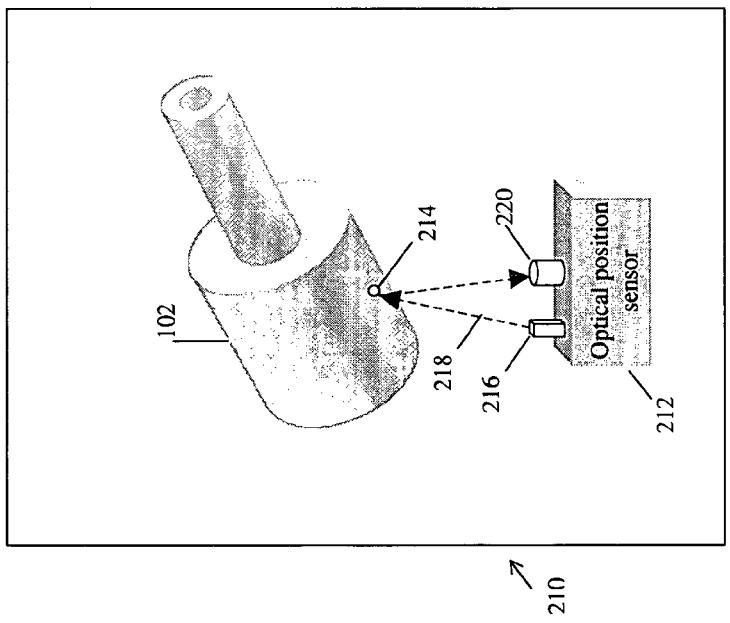
FIG. 2b is a schematic view of a further embodiment of the present invention.
Figure 2A:
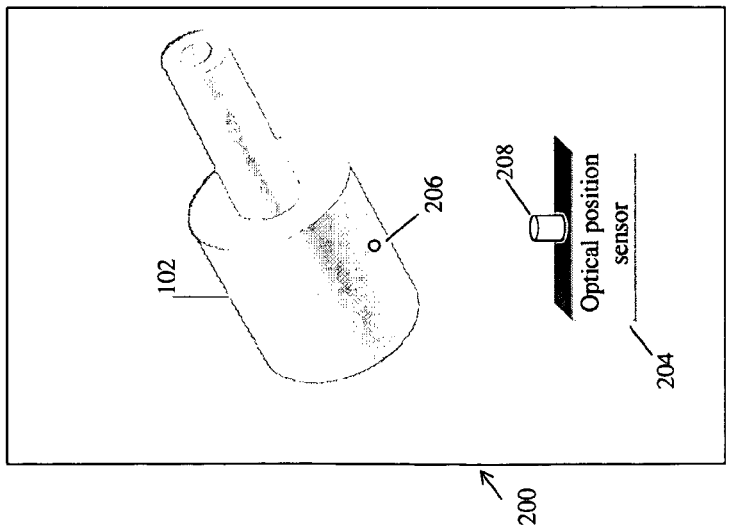
FIG. 2a is a schematic view of a further embodiment of the present invention.

FIG. 2b shows the use of another type of an optical position tracking device 210 that makes use of another type of optical position sensor 212. Tracking a body with this alternate optical position tracking device 210 entails affixing a reflective body (e.g., a retro-reflector) 214 on the body 102. An emissive light source 216 is aligned with the reflective body 214 such that a beam of light 218 generated by the emissive light source 216 reflects off the reflective body 214 in such a manner that a light sensor 220 in the optical position sensor 212 may thereafter detect it and thus track the position of the reflective body 214 as it moves with the body 102. The Motus system by Peak Performance Technologies, Inc. (Englewood, Colo.) is a manufacturer of position measurement devices as shown in FIG. 2b.

FIG. 2c shows the use of a position tracking device 224 that uses magnets 226 affixed to the body 102. The changes in the direction and amplitude of magnetic flux of the magnets 226 as the magnets 226 move with the body 102 are sensed by the magnetic position sensor 228 and used to determine the position of the magnets 226. Examples of manufactures of this type of tracking technology are Polhemus Incorporated of Colchester, Vt., and Ascension Technology Corporation of Burlington, Vt.

Although only one point 124 is depicted as being tracked on the surface of the body 102 to simplify the description, it should be evident that multiple tracking points may be tracked on the same body 102, each with a separate position-tracking device. In fact, multiple tracking points may be necessary to determine the full rotational orientation of the body 102. Multiple bodies 102 can also be tracked at the same time by a single system.

Referring once again to FIG. 1, the shape characterization system identifies the orientation of the axes $X_B$, $Y_B$, and $Z_B$ of the body 102 denoted as items numbered 114, 116, and 118, respectively, with respect to the global coordinate system 112 by estimating a bounding volume of the body 102 and determining the axes of the bounding volume. Specifically, an axis of interest 114, 116, or 118 of the body 102 can be determined through an analysis of the estimated bounding volume. It follows that the remaining axes are normal to the determined axis and to one another. If necessary, the orientation of the remaining axis may be determined more precisely by analyzing the position information provided by the tracking device and the estimated bounding volume. One point 124 of particular interest is a tip 126 of the body 102. The tip 126 can be located coaxially with the axis of interest (for example, the body axis $X_B$ 114) or located at some other point not on the axis of interest.

The plurality of cameras 108-1 through 108-M positioned around the body capture images of the body from different perspectives. These cameras 108-1 through 108-M may be either fixed image cameras or video cameras, or some combination of the two camera technologies. If video cameras are used then individual frames of the video captured by the video camera are processed as single images. Preferably, all of the cameras capture frames nearly synchronously in time so that images from multiple view points are correlated. The positions and coordinate systems 122-1 through 122-M of the cameras 108-1 and 108-M are calibrated to one another and to the global coordinate system 112 established by the navigation computer 104. One embodiment of the method of calibration of the cameras is described herein below. In the preferred embodiment the cameras 108-1 through 108-M are standard video cameras with frame capture hardware in desktop personal computers or Firewire and USB based cameras that are well known in the art.

Fixed backgrounds 110-1 through 110-N preferably are positioned around the body opposite the cameras. These backgrounds 110-1 through 110-N provide a known surround in an image captured by the cameras 108-1 through 108-M that aids in identifying the edges of the body 102 in the image. The backgrounds 110-1 through 110-M may be neutral, black, white, or any color that would increase the contrast between the portion of the image that represents the background 110-1 through 110-M and the portion of the image that represents the body 102. Further, the backgrounds may be backlit to further increase this contrast. It is possible to perform one embodiment of the method of the present invention without fixed backgrounds. However, this is not preferred because of the increased complexity of the shape determination from having to subtract the background image from the image of the body 102.

The navigation computer 104 processes the images captured by the cameras 108-1 through 108-M. The navigation computer 104 may make use of a body database 130 populated with shape information regarding typical bodies that the navigation computer 104 may have to identify. The shape information of a body in the body database 130 is preferably coordinates of vertex points of the body as are typically be available from a computer aided design system. The navigation computer 104 develops one or more comparison metrics by comparing the bounding volume estimated from processing the images from the cameras 108-1 through 108-M to the shape information that is stored in the body database 130. If the shape information for one of the bodies in the body database 130 is found to be highly correlated with the estimated bounding volume, the navigation computer may use the shape information for the body to refine the estimated bounding volume. For example, the navigation computer may develop a comparison metric by analyzing the distances between each vertex of the estimated bounding volume and a corresponding vertex stored as part of the shape information for a body in the body database 130. An example of another comparison metric that may be developed is the result of analyzing the properties of the inertia moment axes of the estimated bounding volume with the inertia moment axes of a body in the body database 130. Additional comparison metrics are known to those familiar with the art. A preferred embodiment uses a plurality of comparison metrics to determine the degree of correlation between the estimated bounding volume and a body stored in the body database 130.

It is not necessary for the cameras 108-1 through 108-M to image the entire body. Only the portion of the body 102 that is of interest needs to be imaged by the cameras 108-1 through 108-M. Furthermore, the body 102 and the cameras 108-1 through 108-M are preferably positioned with respect to one another so that the field of view of each camera captures approximately the same parts of the body.

Figure 3:
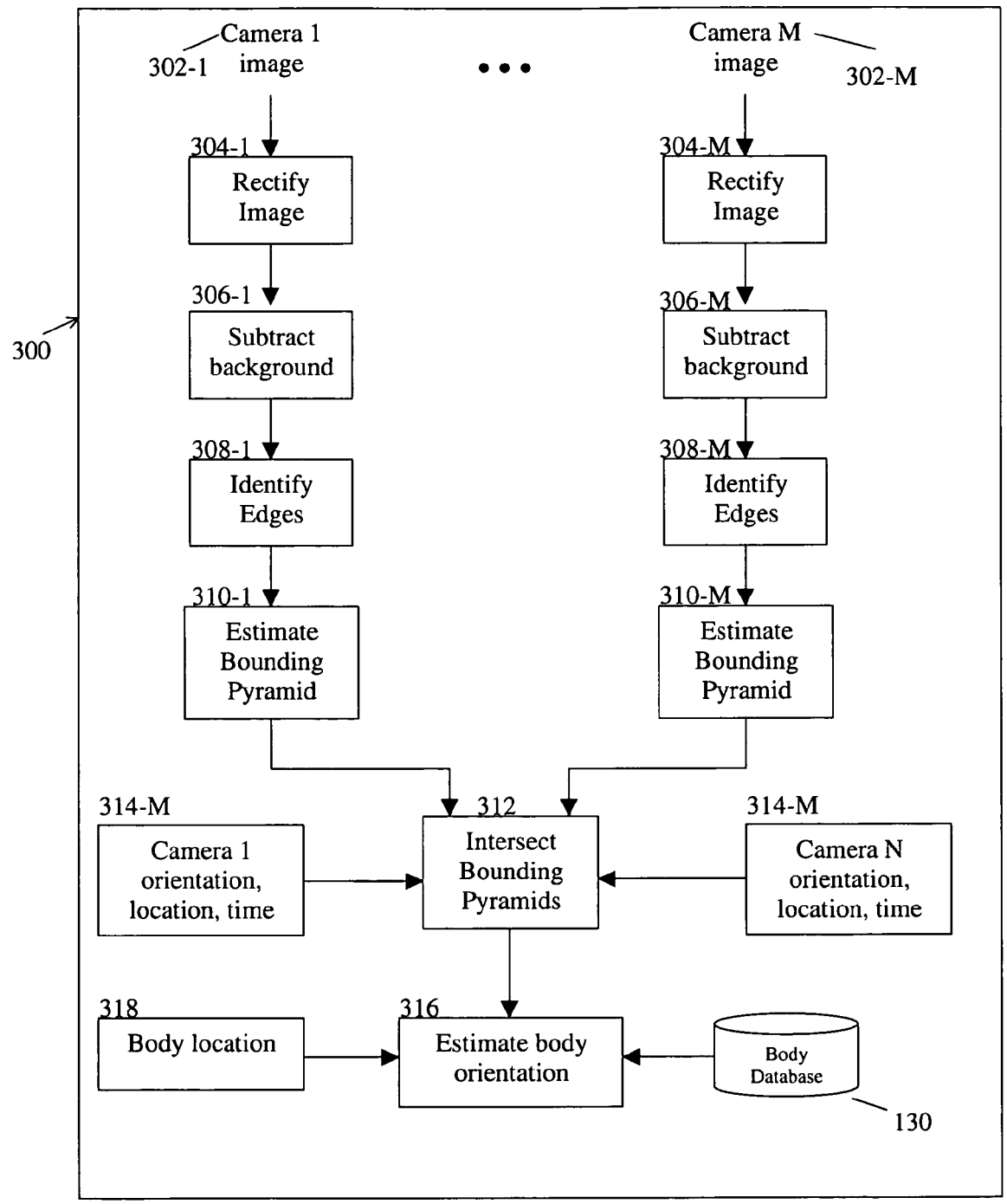
FIG. 3 is a flow diagram of a method of determining the shape according to an embodiment of the present invention.

FIG. 3 depicts a flow chart 300 of the steps used to estimate the bounding volume from the captured images. Each image 302-1 through 302-M captured by a camera 108-1 through 108-M respectively, is first rectified by blocks 304-1 through 304-M. That is, the image is corrected for any known irregularities in the lens, normalized for the known focal length of the lens being used, adjusted for resolution of the camera, etc. Blocks 306-1 through 306-M process the rectified image generated by blocks 304-1 through 304-M to isolate the representation of the body from the representation of the background in the image. Blocks 308-1 through 308-M perform an edge detection operation on the image of the isolated body generated by blocks 306-1 through 306-M. Blocks 310-1 through 310-M use the edge information generated by blocks 308-1 through 308-M to estimate a general bounding pyramid with $K_j$ faces for the body, where $1<=j<=M$. The bounding pyramids calculated in this manner from each of the images 301-1 through 301-M captured by the cameras are normalized by a block 312 based on the time of capture of that image and the location of the camera as provided by blocks 314-1 through 314-M. Blocks 314-1 through 314-M further intersect all of the bounding pyramids with one another to a bounding volume of the body. A block 316 combines the estimated bounding volume with the location of the body from the position tracking device as provided by the block 318 to estimate the position and orientation of the body. If the body database 130 is available to the navigation computer, block 316 compares the bounding volume to the shape information for all of the bodies contained therein. If a body in the body database 130 is found that has dimensions and shape that is within a predetermined tolerance with respect to the bounding volume, then the navigation computer uses the shape information for the body in the body database to refine the estimate of the bounding volume. In the preferred embodiment, the cameras 108 capture images of the body 102 continuously (or as rapidly as the cameras can) and, as the body 102 is rotated, bounding pyramids from these additional images are intersected with a previously calculated bounding volume to refine the estimated bounding volume and the estimated orientation of the body 102.

Figure 4:
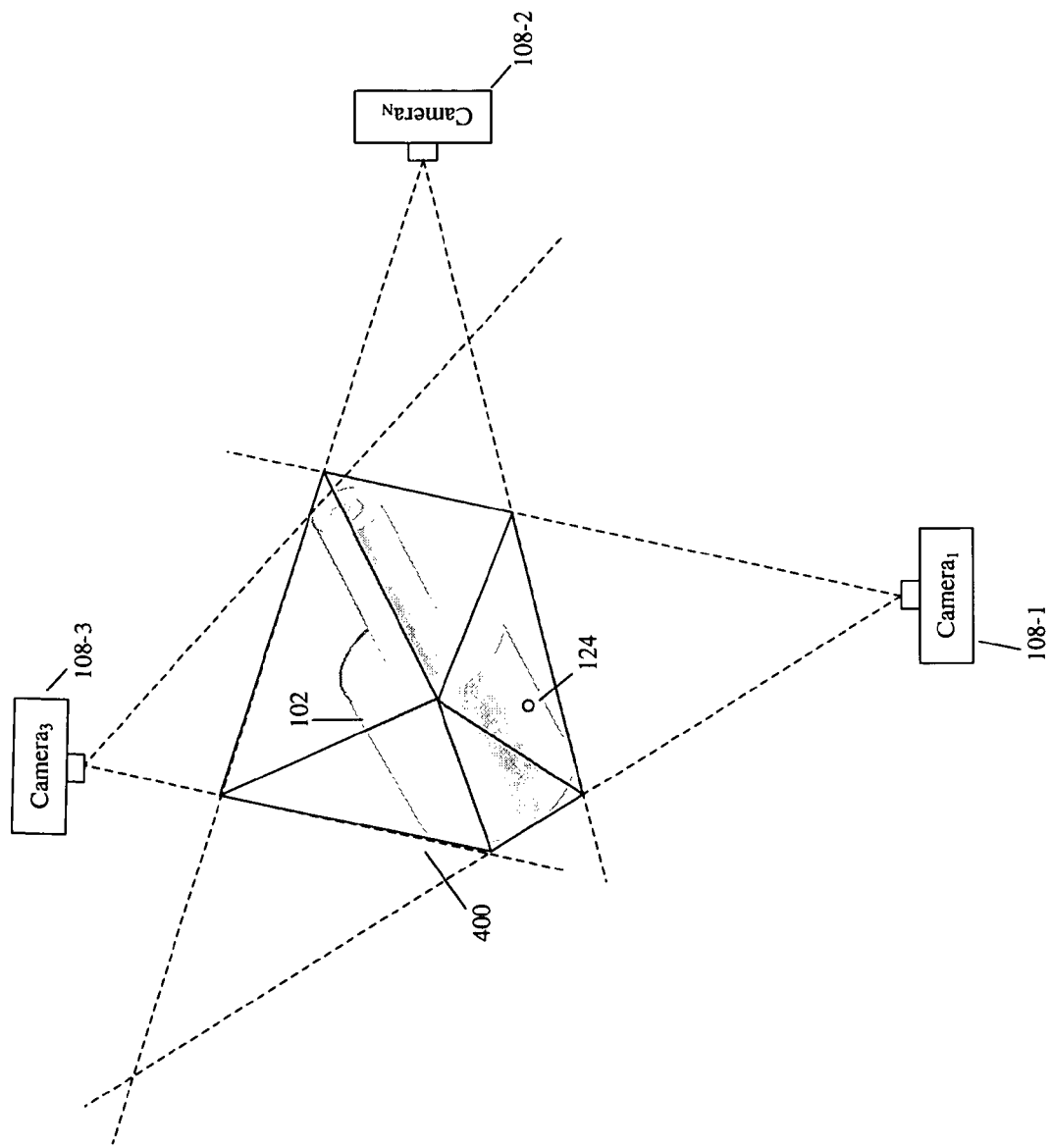
FIG. 4 is a graphical depiction of the shape determining method of FIG. 3.

FIG. 4 shows an example of an initial estimate of a bounding volume 400 of the body 102 generated by using three cameras 108-1, 108-2, and 108-3. The bounding volume of the body 102 can be determined by any of a number of well known methods available for making this determination. Depending on the number of cameras 108-1 through 108-M or views from a single camera 108-1, as discussed hereinafter, the intersection of the combined bounding volumes begins to approximate the shape of the body 102.

Figure 5:
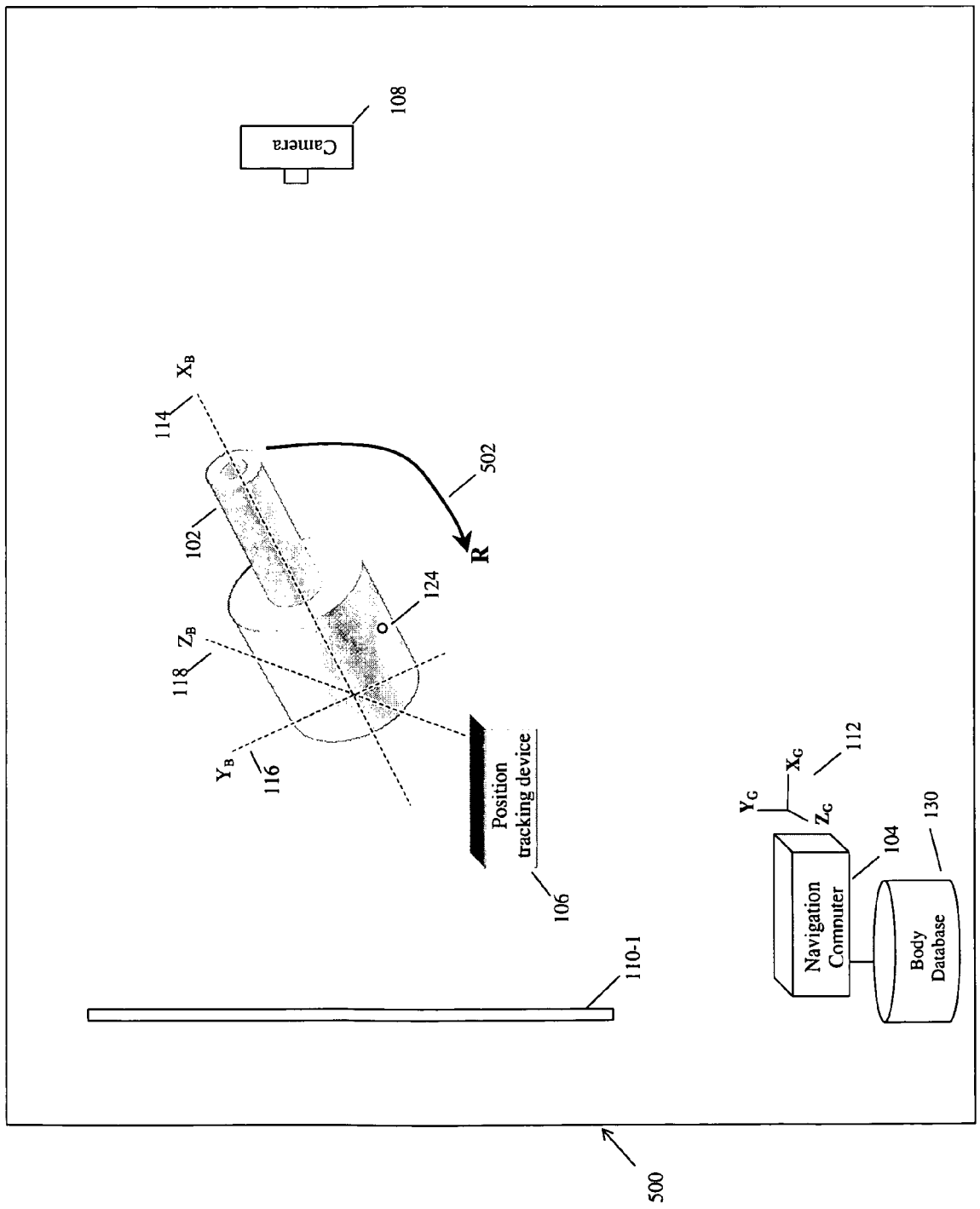
FIG. 5 is a schematic view of a further embodiment of the present invention.

FIG. 5 shows another embodiment of the shape characterization system 500 wherein one camera 108 is used to capture a plurality of images of the body 102 as the body 102 rotates and moves through space, for example, along a path denoted by arrow R 502. The blocks 304 through 318 of FIG. 3 can process all of the images captured by the camera 108 of the body 102 as if a different camera captured each image from a different viewpoint relative to the body 102.

Figure 6:
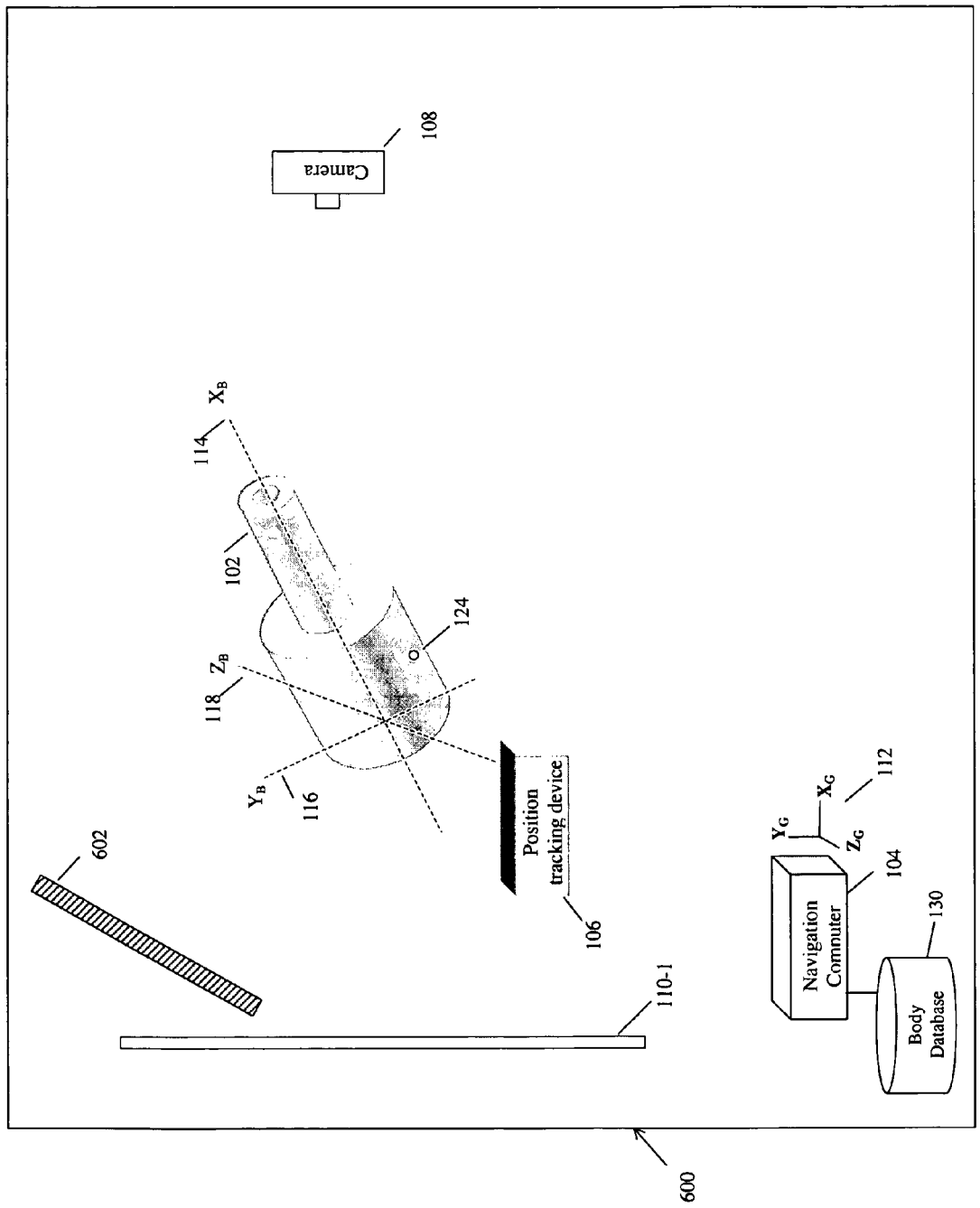
FIG. 6 is a schematic view of yet a further embodiment of the present invention.

FIG. 6 shows yet another embodiment of the shape characterization system 600 wherein the camera 108 simultaneously captures an image of the body 102 and of the reflection of the body 102 in a mirror 602. In this embodiment, the navigation computer 104 processes the image captured by the camera 108 to divide the image into two images wherein one image contains the image of the body 102 and the other image contains the image of the reflection of the body 102 in the mirror 602. In effect, the mirror 602 acts as a second, albeit virtual, camera. As such, the blocks 302 through 318 of the flowchart 300 depicted in FIG. 3 act upon the image of the reflection of the body 102 in the mirror 602 as if the image had been captured by separate camera. In a similar manner, more than one mirror 602 could be employed.

An embodiment to calibrate the coordinate systems 122-1 through 122-M of the cameras 108-1 through 108-M of the shape characterization system 100 with respect to each other and with respect to the coordinate system 112 of the computer navigation system is through the use of a calibration body with an exactly known shape. FIG. 7 shows an example of such a calibration body 700. FIG. 7a shows a front view 702 of the calibration body 700. FIG. 7b shows a side view 704 of the calibration body 700. FIG. 7c shows a top view of the calibration body 706.

Figure 8:
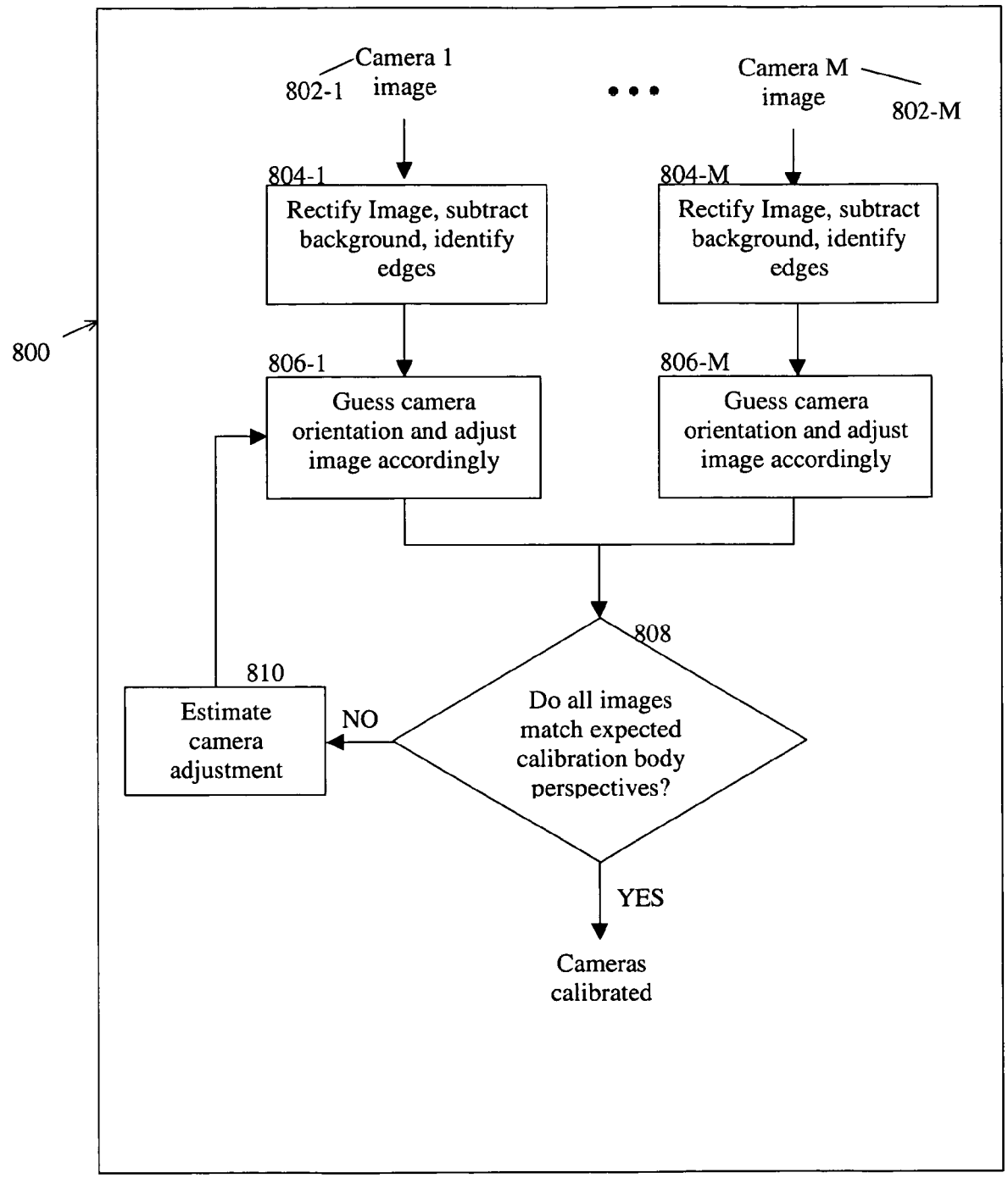
FIG. 8 is a flow diagram of a camera calibration process.

FIG. 8 depicts a flowchart 800 of the steps required to calibrate the cameras. Blocks 804-1 through 804-M rectify, isolate the body and identify edges of images 802-1 through 802-M from each of the cameras, wherein each image 802-1 through 802-M is an image of known perspective (e.g., front 702, side 704, and top 706) views of the calibration body 700. Blocks 806-1 through 806-M estimate position and orientation of each camera 108 and apply corrections based on the position and orientation estimate to the edges generated by blocks 804-1 through 804-M. A block 808 compares the edges as corrected by blocks 806-1 through 806-M with the known edge information of perspectives of the calibration body. If the corrected edges are within a predetermined tolerance of the known edges, then the cameras are said to have been calibrated and the position and orientation information generated by the block 806 is useable by the navigation computer 104. If the corrected edges are outside of the predetermined tolerance of the known edges, then the difference between the corrected edges and the known edges is calculated by a block 810 and provided to the block 806 to refine the guess of the position and orientation of each camera. The blocks 806, 808, and 810 are repeated until all of the cameras 108 are calibrated.

Figure 9:
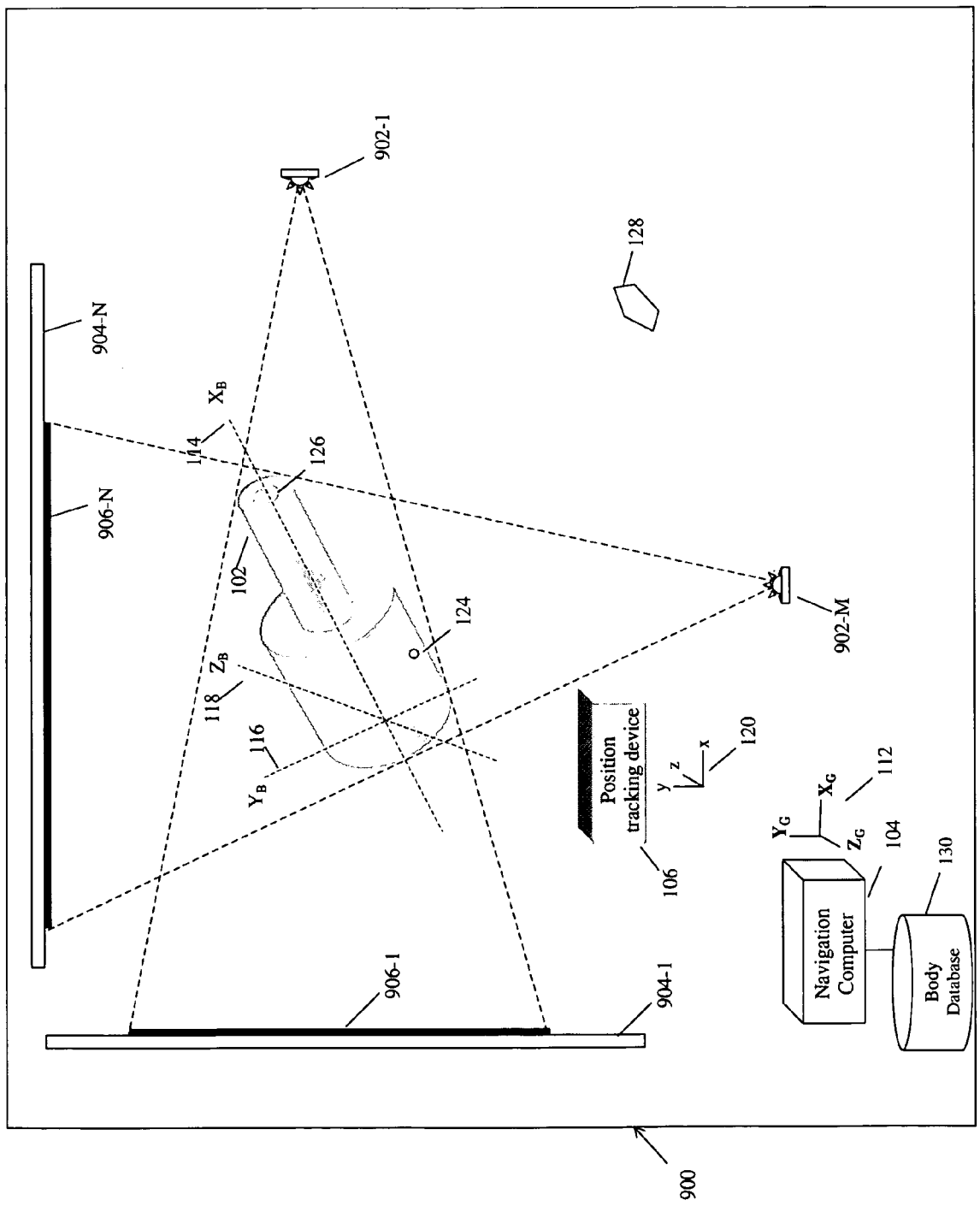
FIG. 9 is a schematic representation of another embodiment of the present invention.

FIG. 9 shows another embodiment of the shape characterization system 900. Instead of using cameras 108-1 through 108-M to capture images of the body 102 against a background 110-1 through 110-N, this embodiment uses light sources 902-1 through 902-M positioned with respect to sensors 904-1 through 904-N. The positions of the light sources 902-1 through 902-M and the sensors 904-1 through 904-N are in a predetermined fixed relation to each other and known to the navigation computer 104. Alternately, the navigation computer 104 tracks the positions of all of the light sources 902-1 through 902-M and all of the sensors 904-1 through 904-N and can transform information from the sensors to be equivalent to information derived for a system wherein the position of the light sources 902-1 through 902-M is in a fixed relation to the position of the sensors 940-1 through 904-N. In addition, the navigation computer 104 tracks changes in the position of either the light sources 902-1 through 902-M or the sensors 904-1 through 904-N. Furthermore, the light sources 902-1 through 902-M and the sensors 904-1 through 904-N are positioned with respect to one another and the body 102 such that the body 102 occludes the light from each of the light sources 902-1 through 902-M and causes a shadow to be cast upon one of the sensors 904-1 through 904-N that is collinear with the light source 902-1 through 902-M and the body 102. The sensors 904-1 through 904-N are 2-dimensional sensing devices that are able to distinguish the regions that are in the shadow 906-1 through 906-N of the body 102 from those regions that are not. Each of the sensors 904-1 through 904-N provide information regarding the regions that are in shadow 906-1 through 906-N to the navigation computer 104. Only the shadows 906-1 through 906-N of the portion of the body 102 that is of interest needs to fall upon the sensors 904-1 through 904-N. A preferred sensor type is a 2-dimensional charge coupled device (CCD) array. Such a CCD array typically produces an image that is comprised of pixels wherein each pixel corresponds to one CCD element of the 2-dimensional array.

Figure 10:
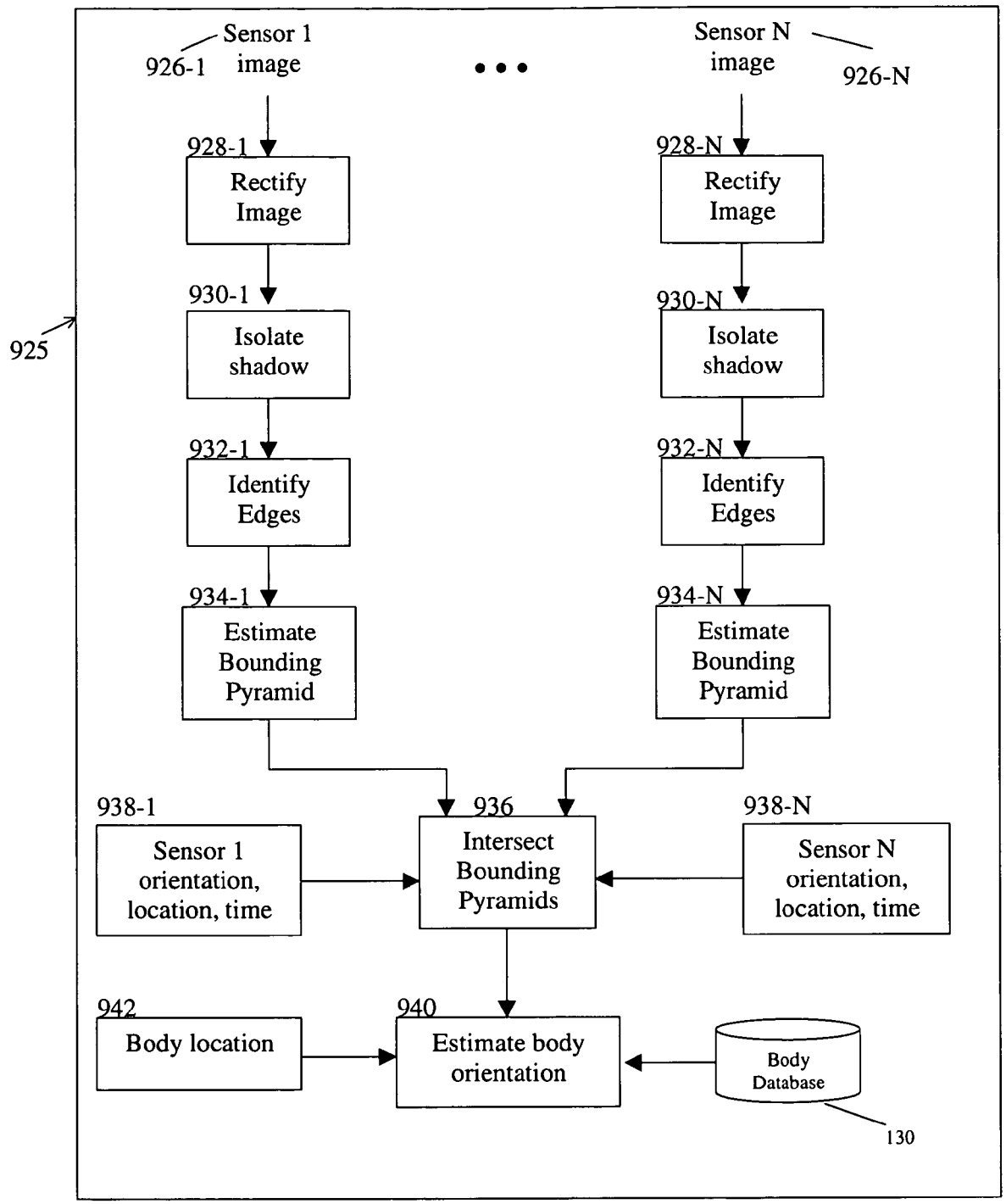
FIG. 10 is a flow diagram of a method of determining the shape according to the embodiment of the present invention depicted in FIG. 9.

FIG. 10 depicts a flow chart 925 of the steps used to estimate the bounding volume from the images generated by the sensors 904-1 through 904-N. Each image 926-1 through 926-N from each of the sensors 904-1 through 904-N is first rectified by blocks 928-1 through 928-N. That is blocks 928-1 through 928-N correct the image for any known irregularities in the sensor, adjusts the shadow information for the resolution of the sensor, etc. Blocks 930-1 through 930-N process the rectified images generated by blocks 928-1 through 928-N to isolate the portions of the images that represent the shadow cast. Blocks 932-1 through 932-N perform an edge detection operation on the images of the isolated shadow generated by blocks 930-1 through 930-N. Blocks 934-1 through 934-N use the edge information generated by block 932-1 through 932-N to estimate a general bounding pyramid with N faces for the body. The bounding pyramids calculated in this manner from the each of the images 926-1 through 926-N generated by the sensors are normalized by a block 936 based on the time of capture of that image and the location of the camera as provided by blocks 938-1 through 938-N. The block 936 further intersects all of the bounding pyramids with one another to a estimate bounding volume of the body. A block 940 combines the estimated bounding volume with the location of the body from the position tracking device as provided by the block 942 to estimate the position and orientation of the body. Block 940 uses shape information from the body database if it is available. Specifically, if a body in the body database 130 is found that has dimensions and shape that is within a predetermined tolerance with respect to the bounding volume, then the navigation computer 104 will use the shape information for the body in the body database to refine the estimate of the bounding volume. In the preferred embodiment, the sensors 904-1 through 904-N generate representations of the shadow 906-1 through 906-N of the body 102 continuously (or as rapidly as the sensors can) and, as the body 102 is rotated, bounding pyramids from these additional representations are intersected with a previously calculated bounding volume to refine the estimated bounding volume and the estimated orientation of the body 102.

Figure 11:
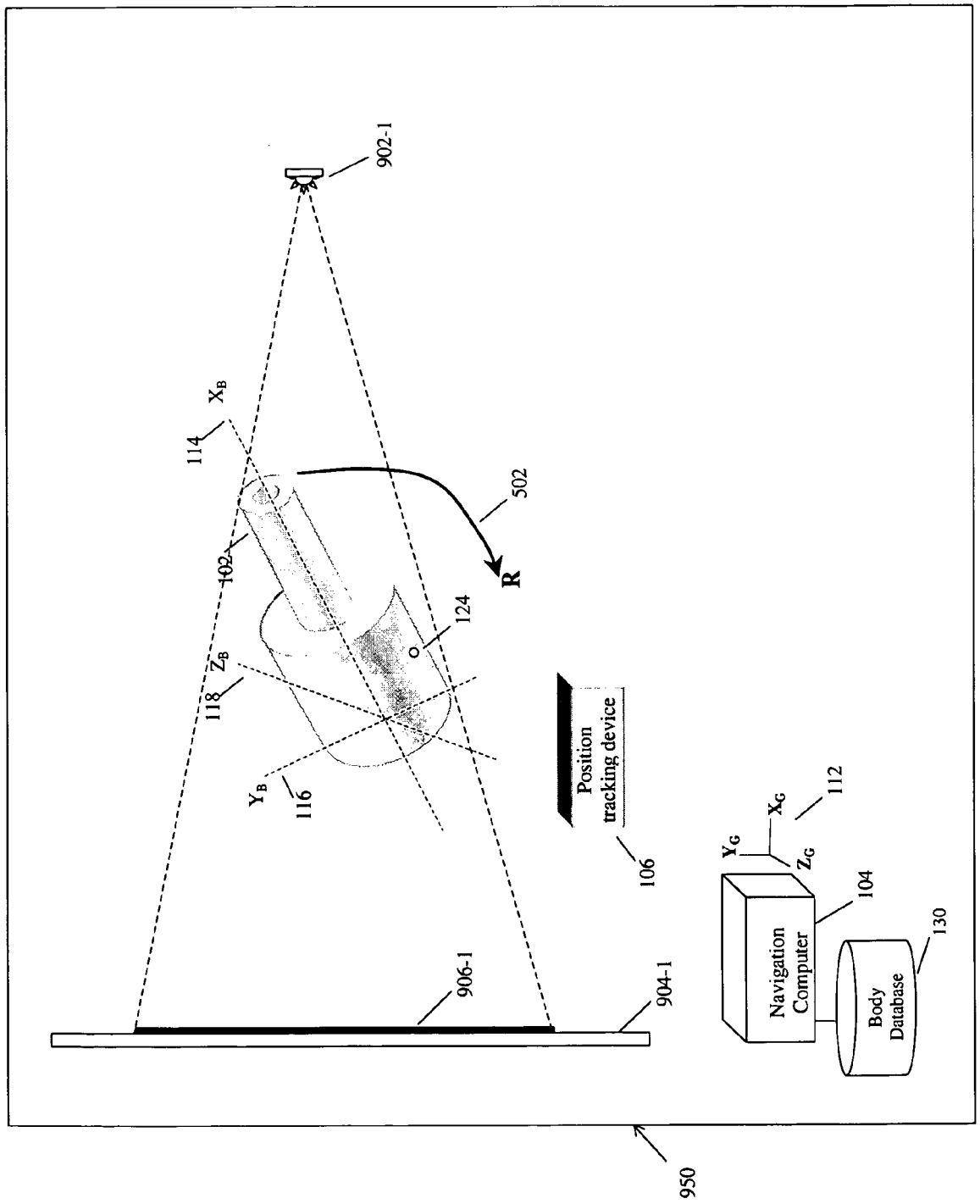
FIG. 11 is yet another embodiment of the present invention.

FIG. 11 shows another embodiment of the shape characterization system 950 wherein one sensor 904 is used to generate a plurality images with representations of a shadow 906 of the body 102 as the body 102 moves through space while being illuminated by one light source 902, for example, along a path denoted by arrow R 502. The blocks 928 through 940 of FIG. 10 can process all of the images generated by the sensor 904 of the body 102 as if a different sensor generated each image.

The shadow sensing devices can be calibrated using a body of known shape and dimension. A representative body 700 that can be used for calibration is depicted in FIG. 7a and the use of this body for calibrating the shadow sensing devices is the same as the process to calibrate the cameras described hereinabove except images from the shadow sensing devices 906-1 through 906-N are used instead of images from cameras 108.

The algorithms used to estimate the shape of the body 102 can be any of those well known and used in the field of computer graphics. Such algorithms are described in publications used in the field such as *Computer Graphics: Principles and Practice*, by James D. Foley, et al (Addison-Wesley, 1990), which is incorporated herein by reference. From the shape of the body 102 determined, the system can then determine the location of the tip 126.

If at least two sensing devices (either cameras 108 or shadow sensing devices 904) are used then the emitter 124 and the position tracking device 106 are not necessary, because the image of the body (or the shadow of the body) for one of the multiple devices provides information about the relative position of the body 102 with respect to the other devices. This information can be used to deduce the position of the body 102 with respect to the coordinate system 112 of the navigation computer 104 by, for example, stereographically determining multiple homologous point pairs in at least two camera views of the body 102. This is because the position of the sensing devices (either 108 or 904) with respect to the coordinate system 112 of the navigation computer 104 is known and tracked during the operation of the shape characterization system and linear transformation can be used to map between the coordinate systems of the sensing devices 108 or 904 and the navigation computer 104.

In addition, to further enhance the reality of the body 102 as it is displayed on a display monitor, coloration and or texture can also optionally be created by known methods. In this case, one or more light sources 128 optionally can be simulated to shade the rendered view of the body 102 on a computer graphics screen.

We claim:

1. A system for calibrating a tracked shape and orientation of a body comprising:
   a computer navigation system;
   a sensing device adapted to generate a series of representations of a shape of the body;
   a tracking device associated with the body in a fixed relation to the body, the tracking device adapted to be detected by the computer navigation system to locate the body relative to the computer navigation system; and
   the computer navigation system having a central processing unit that is adapted to process the series of representations and a relative location of the body to the computer navigation system to determine the shape and orientation of the body relative to the tracking device, whereby the shape and orientation of the body is calibrated to the tracking device.

2. The system of claim 1, wherein the sensing device includes multiple digital cameras and each representation is an image captured by the camera.

3. The system of claim 2, wherein the sensing device is a video camera and the representation is a frame of video captured by the video camera.

4. The system of claim 2, wherein the system also includes a fixed background that increases the contrast between portions of the representation that represent the background and portions that represent the body to aid in identifying edges of the body in the representation.

5. The system of claim 1, wherein the sensing device senses the shadow cast by the body and the representation is an image of the shadow.

6. The system of claim 5, wherein the sensing device is an array of charge coupled devices that senses the movement of the shadow cast by the body as the body is moved relative to the sensing device.

7. The system of claim 5, wherein the sensing device includes at least one light source positioned with respect to at least one two-dimensional sensor that is adapted to distinguish regions that are in the shadow from regions that are not in the shadow.

8. The system of claim 1, wherein the tracking device is an optical tracking system.

9. The system of claim 8, wherein the tracking device includes an active emitter associated with the body.

10. The system of claim 8, wherein the tracking device includes light emitting diodes.

11. The system of claim 1, wherein the tracking device is a non-optical tracking device.

12. The system of claim 11, wherein the tracking device is a magnetic tracking device.

13. The system of claim 1, wherein the tracking device is fixedly attached to the body.

14. The system of claim 1, wherein the tracking device is integral with the body.

15. The system of claim 1, wherein the sensing device is a single camera that captures multiple images as the body is moved relative to the camera and each representations is an image captured by the camera.

16. The system of claim 1, wherein the computer navigation system tracks the position of a landmark point on the body based on the determined shape and orientation of the body.

17. The system of claim 1, wherein the computer navigation system compares an estimate of the shape of the body with a model of the body selected from a plurality of models stored in the computer navigation system.

18. The system of claim 1, further comprising means for generating edge information from at least one of the representations, wherein the central processing unit can use the edge information to determine the shape and orientation of the body.

19. The system of claim 18, further comprising means for estimating a bounding pyramid of the body from the edge information, wherein the central processing unit can use the bounding pyramid to determine the shape and orientation of the body.

20. The system of claim 19, further comprising means for estimating a bounding volume of the body from the bounding pyramid, wherein the central processing unit can use the bounding volume to determine the shape and orientation of the body.

21. A system for calibrating a tracked shape and orientation of a body comprising:
    a computer navigation system;
    a sensing device adapted to generate a series of representations of a shape of the body based on relative movement between the body and the sensing device;
    an emitter associated with the body in a fixed relation to the body, the emitter adapted to be detected by the computer navigation system to locate the body relative to the computer navigation system; and
    the computer navigation system having a central processing unit that is adapted to process the series of representations and a relative location of the body to the computer navigation system to determine the shape and orientation of the body relative to the emitter, whereby the shape and orientation of the body is calibrated to the emitter.

22. The system of claim 21, wherein the sensing device includes multiple digital video cameras.

23. The system of claim 22, wherein the system also includes a fixed background that increases the contrast between portions of the representation that represent the background and portions that represent the body to aid in identifying edges of the body in the representation.

24. The system of claim 21, wherein the tracking device is an optical tracking system.

25. The system of claim 24, wherein the tracking device includes an active emitter associated with the body.

26. The system of claim 24, wherein the tracking device includes light emitting diodes.

27. The system of claim 21, wherein the tracking device is a non-optical tracking device.

28. The system of claim 27, wherein the tracking device is a magnetic tracking device.

29. The system of claim 21, wherein the tracking device is fixedly attached to the body.

30. The system of claim 21, wherein the tracking device is integral with the body.

31. The system of claim 21, wherein the sensing device is a single camera and each representation is an image of the body captured by the camera.

32. The system of claim 21, wherein the sensing device senses a shadow cast by the body.

33. The system of claim 21, wherein the computer navigation system tracks the position of a landmark point on the body based on the determined shape and orientation of the body.

34. The system of claim 21, wherein the computer navigation system compares an estimate of the shape of the body with a model of the body selected from a plurality of models stored in the computer navigation system.

35. A method of determining the shape of a body using a computer navigation system, the method comprising the steps of:
  generating a series of representations of the body;
  generating edge information from at least one of the representations;
  estimating one or more bounding pyramids from the edge information;
  determining a composite bounding volume of the body from the one or more bounding pyramids;
  determining the shape of the body from the composite bounding volume; and
  determining a position and an orientation of the body using a tracking device associated with the body that communicates with the computer navigation system.

36. The method of claim 35, wherein the method includes calibrating the body to the computer navigation system so that the computer navigation system can track both the position and orientation of the body.

37. The method of claim 35, wherein the generating step is done using a video camera and each representation is a frame of video from a video camera.

38. The method of claim 35, wherein the generating step is done by sensing the shadow cast by the body and each representation is an image of the shadow.

39. The method of claim 35, wherein the generating step is done by a single camera that captures multiple images as the body is moved relative to the camera.

40. The system of claim 35, wherein the computer navigation system tracks the position of a landmark point on the body based on the determined shape and orientation of the body.

41. The system of claim 35, wherein the determining step includes comparing an estimate of the shape of the body with a model of the body selected from a plurality of models stored in the computer navigation system.

42. The method of claim 35, wherein the step of generating a series of representations of the body comprises the steps of capturing a series of images of the body and isolating the representations of the body from representations of a background in the series of images.

43. The method of claim 35, further comprising the step of calibrating a sensing device to estimate a position and orientation of the sensing device relative to the computer navigation system, wherein the sensing device is used to generate the series of representations of the body.

44. The method of claim 43, wherein the step of calibrating the sensing device further includes the steps of generating a series of representations of a calibration body with a known shape, wherein each representation is a known perspective view of the calibration body, identifying edges of the calibration body from the series of representations, estimating a position and orientation of each sensing device, comparing the identified edges with known edge information of the calibration body, and correcting the estimated position and orientation of each sensing device based on the comparing step.

45. The method of claim 35, wherein the step of determining the composite bounding volume includes the step of intersecting multiple bounding pyramids with one another.

46. A method of determining the shape and orientation of a body using a computer navigation system, the method comprising the steps of:
  generating a series of representations of the body from at least two perspectives;
  determining a composite bounding volume of the body from the series of representations;
  estimating the shape of the body from the composite bounding volume;
  comparing the estimated shape of the body to stored shape information using comparison metrics;
  refining the estimated shape based on the comparison; and
  determining the position and orientation of the body from the shape of the body and the series of representations of the body.

47. The method of claim 46, wherein the generating step is done using at least two video cameras and each representation is a frame of video from each video camera.

48. The method of claim 46, wherein the generating step is done by sensing at least two shadows cast by the body and each representation is an image of the shadow.

* * * * *